May 17, 1966 D. VON SANDEN 3,251,944
CIRCUIT ARRANGEMENT CONSTRUCTED IN THE MANNER OF A COUPLING MULTIPLEX FOR THE CONNECTION OF TIME DIVISION MULTIPLEX TELEPHONE SYSTEMS
Filed June 26, 1962 2 Sheets-Sheet 1

3,251,944

CIRCUIT ARRANGEMENT CONSTRUCTED IN THE MANNER OF A COUPLING MULTIPLEX FOR THE CONNECTION OF TIME DIVISION MULTIPLEX TELEPHONE SYSTEMS

Dieter Von Sanden, Munich-Solln, Germany, assignor to Siemens & Halske Aktiengesellschaft, Berlin, Germany, a corporation of Germany Filed June 26, 1962, Ser. No. 205,404
Claims priority, application Germany, June 29, 1961, S 74,559
8 Claims. (Cl. 179—15)

Figure 1:
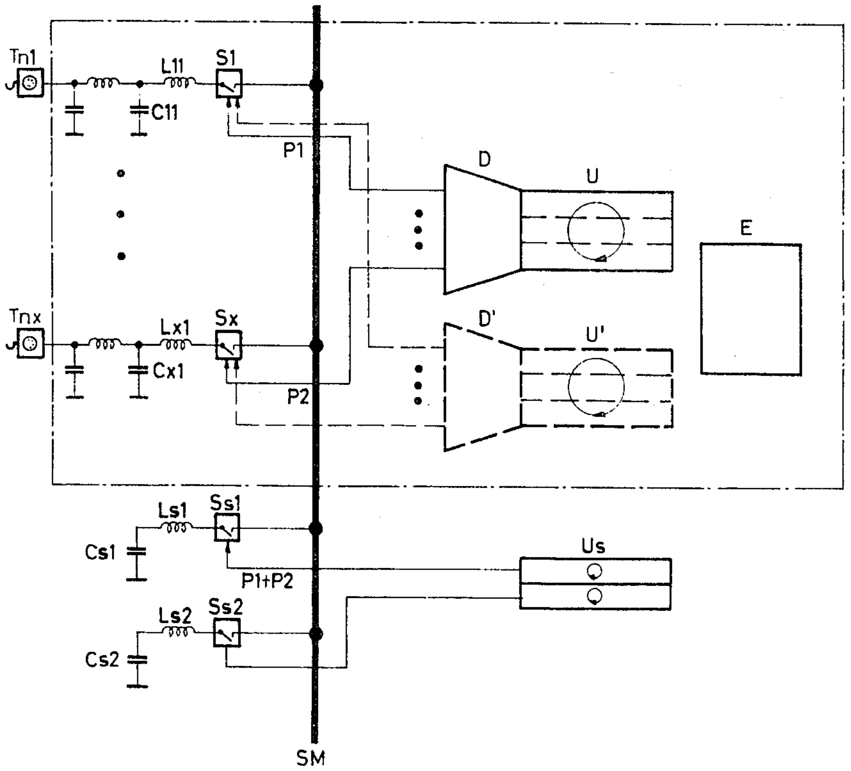

The invention disclosed herein is concerned with a circuit arrangement for time multiplex telephone systems.

In such a system, messages to be exchanged between subscribers are modulated on impulse sequences which are mutually displaced, thus permitting plural utilization of connection paths. Of the known, in part differently constructed time multiplex telephone systems, only those are of interest in connection with the present invention, which operate with speech or call multiplex lines over which are extended incoming as well as outgoing subscriber calls. As will be presently explained more in detail, systems of this kind are in particular manner subdivided into component devices.

There exists, for readily understandable reasons, the desire to extend calls between subscriber stations which are connected to different kinds of telephone systems. Such systems or exchanges may be located in the direct neighborhood of the system or exchange here involved. In the case of time multiplex telephone systems, the maximum number of subscriber stations which may be connected to the same system or exchange is for sundry technical reasons limited. In the case of a very great number of subscriber stations, for example, ten thousand stations, it will be necessary to provide instead of a single large capacity system or exchange, several exchanges with smaller capacity, such exchanges being spatially directly neighboring and cooperating mutually over a given circuit arrangement.

The present invention shows a way of constructing such a circuit arrangement in especially appropriate manner, offering the particular advantage of effecting savings without requiring any particular expenditures.

Systems are already known (see, for example, British Patent No. 822,297), comprising circuit arrangements over which can be connected subscribers of a plurality of subscriber groups which are respectively provided with call multiplex lines individual thereto. The connections are effected with the aid of storer serving respectively for storing the speech energy which is to be exchanged between subscribers involved in given connections. It is to be considered in this connection that subscriber stations involved in calls are generally connected at different instants to the call multiplex lines of their respective groups, such connections being effected by means of call switches which are respectively individual to the stations involved. The speech energy storers serve for bridging the time intervals which elapse between the instants at which the call switches are actuated, such switches being operative for connecting the respective subscriber stations impulse-wise with the corresponding call multiplex lines. The involved call multiplex lines are by means of auxiliary switches impulse-wise periodically interconnected synchronously with the operation of the call switches. Accordingly, the calls between subscribers of different subscriber groups are here effected with the aid of such speech energy storers. It may be expected, in the case of relatively many such subscriber groups, that the greater number of calls involves these subscriber groups while fewer calls are effected among subscribers within the respective groups. It will accordingly be necessary to provide a relatively large number of speech energy storers and also special devices for controlling and for allocating these speech energy storers in suitable manner to the various calls.

The invention proposes a different way for effecting connections between subscribers of various subscriber groups and various communications system, respectively. The circuit arrangement used therefor also facilitates the traffic within the communication systems. A particular advantage of the new circuit arrangement resides in that it requires only a relatively small number of speech energy storers.

The invention is accordingly concerned with a circuit arrangement for effecting connections between a plurality of time multiplex telephone systems which are respectively provided, each with a call multiplex line which is common to outgoing and incoming calls, and having call switches for periodically impulse-wise connecting to the corresponding call multiplex lines subscriber stations of the respective systems which are involved in calls. The particular feature of this circuit arrangement resides in that it is constructed in the manner of a coupling multiple or cross wire field, the call multiplex conductors being individually connected to the lines or rows thereof, so as to effect over the column conductors, connections between the different time multiplex telephone systems, by impulse-wise actuation of coupling point or crossing point contacts, whereby connections are established between given line conductors, and to also effect connections or calls within the respective time multiplex telephone systems, by impulse-wise actuation of coupling point contacts, whereby connections are established with time multiplex communication systems having instead of subscribers, speech energy storers which are connected to their multiplex lines twice per period, such multiplex lines being connected to particular columns, thus requiring in all these cases of operation, at the same instant, the actuation of only one call switch, since the speech energy storers bridge in known manner the intervals between the instants of actuating the call switches allocated to the subscriber stations which are to be interconnected for the energy exchange between the respective subscriber stations.

As noted above, the circuit arrangement according to the present invention requires actuation, at the same instant, of only one call switch. This applies to connections extending between different time multiplex telephone systems as well as to connections effected within a respective time multiplex telephone system. This results in considerable simplification with respect to the control of the call switches and likewise in considerable savings so far as the technical expenditures are concerned.

Further details of the invention will appear from the description which is rendered below with reference to the accompanying drawings.

Figure 2:
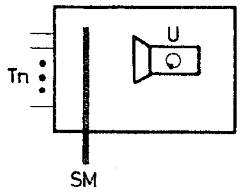
Figure 3:
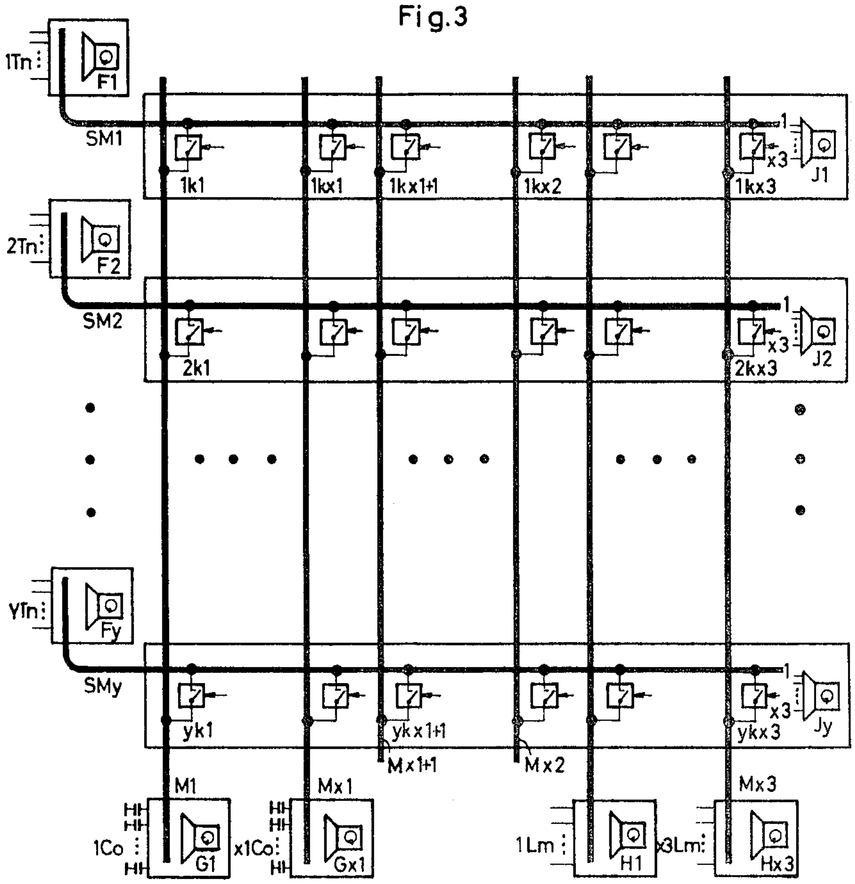

FIGS. 1 and 2 show in schematic manner an example of a known time multiplex telephone system; and FIG. 3 shows in schematic manner an example of a circuit arrangement constructed according to the present invention.

The example of a known time multiplex telephone system, shown in FIGS. 1 and 2, will be explained first in order to facilitate the understanding of the importance as well as of the significance of the invention and the advantages achieved thereby. Only those parts of a time multiplex telephone system are shown in FIG. 1, which are required for an understanding of the circuit arrangement constructed in accordance with the invention.

Referring now to FIG. 1, $Tn1$ . . . $Tnx$ indicate subscriber stations connected to the system. These stations can be connected to the call multiplex line SM by means of respective call switches S1 . . . Sx. The call switches are operatively controlled by control pulses which are supplied with the aid of cyclic storers. Thus, there may be provided, for example, two cyclic storers, indicated in FIG. 1 by U and U'. In the cyclic storer U are in encoded form cycled the directory numbers of subscribers engaged in outgoing calls and in the cyclic storer U' are in corresponding manner cycled the directory numbers of subscribers engaged in incoming calls. The directory numbers which are present in encoded form are referred to as addresses. The addresses involved in a call have the same cycling phase and therefore are simultaneously delivered at the outputs of the cyclic storers, to which are connected the so-called triggering decoders indicated respectively at D and D'. Each triggering decoder has as many outputs as there are subscribers, each output being allocated to a definite subscriber. Each call switch S1 . . . Sx is connected with an output of the triggering decoder D and also with an output of the triggering decoder D'. Responsive to the extension of a subscriber address to a triggering decoder, the latter will deliver an impulse at the output, which impulse is allocated to the respective subscriber. The corresponding impulse is used for the operative control of the call switch S1 . . . Sx which is individual to the respective subscriber. Simultaneous delivery of an impulse at outputs of the two triggering decoders D, D', which impulses are allocated to two different subscribers, results in brief simultaneous operative actuation of the call switches such as S1 . . . Sx of the respective two subscribers, thereby interconnecting the corresponding two subscriber stations over the call multiplex line SM. This operation is periodically repeated with the cycling period of the addresses which are being cycled in the cyclic storers, thus effecting the desired connections between subscriber stations involved in calls.

The system includes in addition to the above described devices other and further devices, especially devices for extending connections and for releasing completed connections. These other devices are merely symbolically indicated by the rectangle marked E.

In such a system, connections may also be extended, without the use of the cyclic storer U, provided that speech energy storers are employed, as cited before, for bridging given time intervals. Such speech energy storers are represented by capacitors Cs1 and Cs2. These capacitors cooperate for the speech energy exchange, if desired, with further capacitors which are assigned to the respective subscriber stations, such further capacitors being indicated at C11 . . . Cx1. The capacitors Cx1 and Cs2 may likewise be connected periodically, impulse-wise, over switches Ss1 and Ss2, with the call multiplex line SM, such connections being effected with the aid of the cyclic storer Us. Such cyclic storer Us controls considerably fewer switches than the cyclic storers U and U', and the structure thereof can accordingly be much simpler.

A connection or call is, with the use of the speech energy storer, maintained as follows: In the cyclic storer U are periodically cycled, displaced as to time, the addresses of the two subscriber stations which are to be interconnected, for example, the addresses of the stations Tn1 and Tnx. The subscriber lines Tn1 and Tnx with their capacitors C11 and Cx1 are thus impulse-wise periodically connected at different instants with the call multiplex line SM. In the cyclic storer Us are in such case cycled, synchronously with the addresses which are being cycled in the cyclic storer U, two control commands for the actuation of the switch Ss1. The capacitor Cs1 is consequently connected to the call multiplex line SM simultaneously with the capacitors C11 and Cx1 which are associated with the subscriber stations. A charge exchange is thereby effected in known manner between the simultaneously connected capacitors (see British Patent No. 822,297), involving the coils Ls1, L11 and Lx1, such charge exchange being a function of the exchange of the speech energy between the subscribers involved in a call. This results in the intended connection between these subscribers.

FIG. 2 shows in simplified symbolic representation the devices of the system which are shown in FIG. 1 within the dot-dash rectangle. The cyclic storer U' and the decoder D', shown in FIG. 1 in dash lines, are not included in the symbolic representation of FIG. 2. This symbolic representation is however employed in FIG. 3 showing the circuit arrangement according to the invention, over which a plurality of time multiplex telephone systems can cooperatively communicate.

This circuit arrangement, and further devices connected therewith, will now be explained more in detail with reference to FIG. 3.

As noted before, this circuit arrangement comprises a so-called coupling multiple or cross wire field forming part thereof. A coupling multiple comprises contacts arranged in definite manner, hereinafter referred to as coupling point contacts, such contacts being disposed in crossing relationship, in lines and columns, and being multipled line-wise and column-wise. Thus, the contacts 1k1 . . . 1kx3 of the coupling multiple are arranged in a line or row, one terminal of each contact being connected with the conductor allotted to the respective line. The other terminal of each contact is individually connected with a column conductor disposed in perpendicular crossing relationship with respect to the line conductor. The contacts 1k1 . . . yk1 lying along a column are analogously connected, each with one terminal or side thereof to a column conductor and the other terminal or side thereof connected individually to a line conductor disposed in perpendicular crossing relationship with respect to the column conductors. The contacts arranged in other lines and columns are in similar manner connected, each with a column conductor and a line conductor, respectively. Closure of one of these contacts connects a line conductor with a column conductor. Two line conductors can be interconnected over a column conductor by closing two contacts connected to one and the same column conductor. For example, the line conductors to which are connected the call multiplex lines SM1 and SMy, can be interconnected over the column conductor Mx1+1 by closing the coupling point contacts 1kx1+1 and ykx1+1.

As mentioned before, to the line or row conductors are connected the call multiplex lines of time multiplex telephone systems. These are the call multiplex lines SM1 . . . SMy of the time multiplex telephone systems F1 . . . Fy. To these systems are connected groups of subscriber stations which have to be served in the extension of calls, the subscriber groups being indicated by 1Tn . . . yTn. The respective time multiplex telephone systems are represented by the symbol shown in FIG. 2, each system having a cyclic storer for subscriber addresses. Accordingly, in a given case, only one call switch will be closed in these systems at the same instant, thereby connecting only one subscriber station to the respective call multiplex line.

To some of the column conductors of the coupling multiple are over multiplex lines M1 . . . Mx1 connected time multiplex communication systems G1 . . . Gx1 which are provided with speech energy storers instead of with subscriber stations. These storers are indicated by capacitors which are according to groups designated by 1Co . . . x1Co. The time multiplex communication systems are likewise provided, each with a cyclic storer, in which are cycled the respective addresses of speech energy storers. These speech energy storers are over respective switches periodically impulse-wise connected to the corresponding multiplex lines in a manner analogous to that in which subscriber stations are connected to their multiplex lines.

No particular devices are connected to some of the column conductors, namely, the column conductors $Mx1+1$ . . . $Mx2$. Over these column conductors are extended calls between subscribers of different time multiplex telephone systems. For example, a connection between a subscriber of the subscriber group $1Tn$ of the system F1 with a subscriber of the subscriber group $yTn$ of the system Fy, is effected as follows:

In the system or exchange F1, the call switch of a given subscriber station is impulse-wise periodically closed, whereby the respective subscriber station is periodically connected with the call multiplex line SM1. The control pulse which effects the contact closure has a definite phase position which is different from the phase positions of control pulses allocated to other subscribers of the same communication system. The coupling point contacts $1kx1+1$ and $ykx1+1$ are impulse-wise periodically closed, synchronously with the call switches allocated to the respective subscriber stations, thus resulting in establishing impulse-wise connection between the call multiplex lines SM1 and SMy. The call multiplex line SMy is a part of the time multiplex telephone system to which is connected the other subscriber station $YTn$ involved in the call. The desired telephone call is here established as a result of cycling the address of the second subscriber $YTn$, in the cyclic storer of the system Fy, whereby the control impulse for the actuation of the call switch allocated to this second subscriber has the same phase position as the control impulse which controls the actuation of the call switch allocated to the first subscriber $1Tn$. Accordingly, the maintenance of this call requires in each respective time multiplex telephone system only one cyclic storer.

It is of course understood that a plurality of calls or connections may be simultaneously present between two given time multiplex telephone systems. However, the control impulses which are respectively allocated to these calls must have different phase positions. These calls may even extend over one and the same column conductor without causing any mutual interference. Subscribers connected to other pairs of time multiplex telephone systems may likewise be interconnected over one and the same column conductor provided that control pulses are used which have different phase positions. Upon using, for the extension of calls between different time multiplex telephone systems, a plurality of column conductors, as is the case in the illustrated circuit arrangement, there may even be a plurality of simultaneous connections which are maintained with the use of control pulses having the same phase positions, provided, of course, that such calls are extended over different column conductors. Since there is in each time multiplex telephone system only one cyclic storer, no trouble can occur on account of the use of the same line conductor for different telephone calls, since each cyclic storer can always deliver only one control pulse with a predetermined phase position.

The communication between subscribers of the same time multiplex telephone system such as the systems G1 . . . $Gx1$, can likewise be effected with the aid of cyclic storers respectively provided in the corresponding systems. These systems which are provided with speech energy storers indicated at $1Co$ and $x1Co$, are respectively connected to some of the column conductors such, for example, as M1 and $Mx1$. Two control pulses with different phase positions are in such cases required for maintaining one and the same telephone call. For example, assuming that two subscribers of the system F1 communicate with each other, the addresses of these two subscribers are cycled mutually displaced in the respective cyclic storer. The call switches of the two subscribers are periodically impulse-wise connected to the call multiplex line SM1, at different instants. In order to bring about the desired connection, the coupling point contact $1k1$ is impulse-wise closed at each such instant, thereby connecting the time multiplex line SM1 with the time multiplex conductor M1 of the system G1. In such case, the address of one and the same speech energy storers has to be cycled twice in the cyclic storer of the system G1, thereby delivering two control pulses for the closure of the coupling point contact $1k1$, such impulses being in phase with the two control pulses delivered for the respective connection in the system F1. The speech energy storer employed in this manner bridges in previously described manner the time interval lying between two closures of the respective call switches in the system F1, thereby effecting the desired connection between the two subscribers of the system F1.

Other pairs of subscribers connected to the same system F1 can simultaneously communicate without mutual interference by employing further speech energy storers which become effective with the aid of necessarily different control pulses. Other pairs of subscribers, connected to other time multiplex telephone systems can likewise carry on conversations, even with the use of speech energy storers forming part of the system G1, provided that other pairs of control pulses are utilized.

Further time multiplex systems having speech energy storers are provided in connection with the circuit arrangement shown in FIG. 3. The makes it possible to carry on undisturbed conversation between subscribers having call switches respectively allocated thereto which are controlled by control pulses having the same phase positions as those which are already utilized for other connections. However, the corresponding calls have to be extended over different column conductors so as avoid mutual interference therebetween. This is automatically accomplished since the same pair of control pulses, in one and the same time multiplex system with speech energy storers, can be delivered for only one speech energy storer, inasmuch as only one cyclic storer is provided in the respective systems.

The construction of the circuit arrangement according to the invention, for effecting communications within and between a plurality of time multiplex telephone systems, makes it possible to extend connections of any kind, despite the fact that the respective systems are constructed in particularly simple manner. Mutual interference between calls is automatically prevented.

In accordance with another feature of the invention, calls may also be effected over lines extending to other exchanges. The call multiplex lines of the systems H1 . . . $Hx3$ are for this purpose extended to particular column conductors which are connected with lines for outgoing and incoming calls extending to other exchanges. These are the line groups $1Lm$ . . . $x3Lm$. In order to effect such calls, coupling point contacts, such for example as the coupling point contact $1kx3$, are respectively impulse-wise closed.

For example, assuming that a subscriber of the system F1 is to be connected with a line in the line group $x3Lm$, the call switch allocated to such subscriber will be actuated by a control pulse, thereby connecting the subscriber periodically impulse-wise to the time multiplex line SM1. In addition thereto, the coupling point contact $1kx3$ is actuated by a control pulse with the same phase position, thereby connecting the call multiplex line SM1 with the call multiplex line $Mx3$. The switch which is in the system $Hx3$ allocated to the line extending to another exchange, is likewise actuated by a control pulse of the same phase position. Each of the time multiplex systems H1 . . . $Hx3$ is provided with only one cyclic storer, thus automatically avoiding the use of control pulses with identical phase positions for the undesired use of the same column conductor for different telephone connections.

Explanations will now be rendered as to the operative actuation of the coupling point contacts of the coupling multiple. These contacts may be actuated with the aid of means similar to those which are employed for the actuation of the call switches. For example, special cyclic storers may be provided for cycling code symbols or signals as addresses allocated to the coupling point contacts and serving for producing the required control pulses which effect the impulse-wise periodic closure of the respective coupling point contacts. The cyclic storers may be allocated, for example, respectively to the individual line conductors of the coupling multiple. This is also indicated in FIG. 3, showing devices J1 . . . Jy which are respectively allocated to the various line conductors, each such device comprising among others, a cyclic storer and a decoder, as described in connection with FIG. 1. The cyclic storer of the device J1 has as many outputs as there are coupling point contacts on the corresponding line conductor. These are the outputs 1 . . . $x3$ over which the respective coupling point contacts are actuated. Coupling point contacts associated with one and the same line conductor are not simultaneously operatively actuated, thereby avoiding interconnections between different telephone calls. Accordingly, one cyclic storer will suffice for the actuation of coupling point contacts associated with any given line conductor. Coupling point contacts connected to any column conductor are to be simultaneously actuated only in case they serve for a given telephone connection.

Instead of providing cyclic storers serving for the actuation of coupling point contacts which are arranged along a line conductor, there may be provided cyclic storers serving for the actuation of coupling point contacts arranged along a column conductor. Care must be taken in such case, to avoid simultaneous actuation of coupling point contacts lying on a given line conductor but extending to different column conductors.

The coupling point contacts as well as call switches and other switches in the various systems, are, in view of the relatively high switching frequency with which they must operate, advantageously realized by electronic contacts such as they are disclosed, for example, in the copending application Serial No. 108,330, filed May 8, 1961, which is owned by the assignee also named in the present case.

Changes may be made within the scope and spirit of the appended claims which define what is believed to be new and desired to have protected by Letters Patent.

I claim:

1. A circuit arrangement constructed in the manner of a coupling multiple which comprises a plurality of line conductors arranged in coordinate manner in operattive crossing relationship with a plurality of column conductors, coupling point contacts disposed at the respective crossing points of the conductors for operatively connecting the same thereat, a plurality of time multiplex telephone systems, each system having a call multiplex line which is common to outgoing and incoming calls, call switches for connecting respective subscriber stations involved in calls to the respective call multiplex lines of the associated system, said stations being periodically impulse-wise connected with their respective call multiplex lines by their respective call switches, means connecting the call multiplex lines individually with respective predetermined line conductors of said coupling multiple, for effecting calls extending between various time multiplex telephone systems, by impulse-wise closure of two coupling point contacts during the same pulse phase whereby given line conductors and therewith given call multiplex lines involved in calls are interconnected over respective column conductors, a plurality of time multiplex telephone systems having speech energy storers operatively connected to the respective multiplex lines thereof, means connecting the multiplex lines of said last-mentioned time multiplex telephone systems individually with respective predetermined column conductors of said coupling multiple, means for operatively connecting said speech energy storers to their respective multiplex lines two times per period, the respective speech energy storers being operative to bridge the time interval elapsing between the instants of actuation of the call switches of the subscriber stations to be interconnected for the energy exchange, for effecting calls extending internally within the respective time multiplex telephone systems, by impulse-wise closure of other coupling point contacts during two pulse phases whereby connections are effected between predetermined column conductors to which speech energy storers are connected.

2. A circuit arrangement according to claim 1, comprising particular column conductors to which are connected call multiplex lines of time multiplex systems having lines for outgoing and incoming calls to be extended to other exchanges, and coupling point contacts cooperatively related to said particular column conductors for interconnecting the latter with respective line conductors to effect such calls.

3. A circuit arrangement according to claim 2, wherein each respective system has one cyclic storer in which are cycled the addresses, represented by code symbols, of switches which are to be closed impulse-wise, as control means for effecting the closure of the respective switches.

4. A circuit arrangement according to claim 1, wherein said speech energy storers comprise capacitors, and coil means cooperating with the respective capacitors, for exchanging the energy stored during the closure time respectively of the corresponding switches and call switches and coupling point contacts, with respect to the speech energy respectively stored in capacitors cooperatively associated with subscriber stations involved in calls.

5. A circuit arrangement according to claim 1, wherein coupling point contacts connected with respective line conductors are actuated by code signals, and cyclic stores operatively connected to said systems, in which the code signals cycled periodically as addresses which are respectively individual to the corresponding line conductors.

6. A circuit arrangement according to claim 5, wherein coupling point contacts connected with one and the same column conductor are simultaneously closed only if they serve in common for extending a call.

7. A circuit arrangement according to claim 3, wherein coupling point contacts connected with one and the same column conductor are actuated by code signals which are cycled periodically as addresses therefor in said cyclic stores.

8. A circuit arrangement according to claim 7, wherein coupling point contacts which are connected to one and the same line conductor but extending to different column conductors are not closed simultaneously.

References Cited by the Examiner

UNITED STATES PATENTS

| | | | |
|---|---|---|---|
| 2,917,583 | 12/1959 | Burton et al. | 179—15 |
| 3,029,311 | 4/1962 | Ward | 179—15 |
| 3,049,593 | 8/1962 | Touraton et al. | 179—15 |
| 3,068,322 | 12/1962 | Feder et al. | 179—15 |

FOREIGN PATENTS

| | | |
|---|---|---|
| 822,297 | 10/1959 | Great Britain. |

DAVID G. REDINBAUGH, *Primary Examiner.*

THOMAS G. KEOUGH, *Assistant Examiner.*